(12) United States Patent
Dubay et al.

(10) Patent No.: US 11,273,860 B2
(45) Date of Patent: Mar. 15, 2022

(54) SYSTEM, METHOD AND APPARATUS FOR A STOWABLE STEERING COLUMN HAVING A COLLAPSE-LIMITED POSITION

(71) Applicant: Steering Solutions IP Holding Corporation, Saginaw, MI (US)

(72) Inventors: Robert W. Dubay, Saginaw, MI (US); Damian Z. Gosztyla, Bay City, MI (US); Robert D. Bueche, Montrose, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 16/951,190

(22) Filed: Nov. 18, 2020

(65) Prior Publication Data

US 2021/0155279 A1 May 27, 2021

Related U.S. Application Data

(60) Provisional application No. 62/939,912, filed on Nov. 25, 2019.

(51) Int. Cl.
*B62D 1/183* (2006.01)
*B60R 21/16* (2006.01)
*B62D 1/181* (2006.01)
*B62D 1/185* (2006.01)

(52) U.S. Cl.
CPC .............. *B62D 1/183* (2013.01); *B60R 21/16* (2013.01); *B62D 1/181* (2013.01); *B62D 1/185* (2013.01)

(58) Field of Classification Search
CPC ........ B62D 1/192; B62D 1/197; B62D 1/184; B62D 1/185; B62D 1/181; B62D 1/183; B62D 1/19; F16F 7/125; F16F 7/126; F16F 7/127
See application file for complete search history.

(56) References Cited

U.S. PATENT DOCUMENTS

| 10,385,930 B2 * | 8/2019 | Magnus .................. F16D 15/00 |
| 2013/0008212 A1 * | 1/2013 | Kantajaraniti ........ B60R 25/005 |
| | | 70/198 |

FOREIGN PATENT DOCUMENTS

| DE | 202005013054 U1 * | 10/2005 | ............. B62D 1/195 |
| DE | 102005028054 B3 * | 12/2006 | ............. B62D 1/192 |
| EP | 1882621 A1 * | 1/2008 | ............. B62D 1/197 |
| KR | 20160118419 A * | 10/2016 | |

* cited by examiner

*Primary Examiner* — Paul N Dickson
*Assistant Examiner* — Matthew D Lee
(74) *Attorney, Agent, or Firm* — Dickinson Wright PLLC (57) ABSTRACT

A collapse-limiting assembly for a steering system is provided. The collapse-limiting assembly comprises a housing and a moveable member. A pyrotechnic charge is located in the housing and, in response to an impact event, is caused to fire the moveable member into a discharged position and limit the amount of collapse of a steering column. The steering column includes at least two axially moveable portions that move axially relative to each other between an extended position and a retracted position. When the moveable member is fired into the discharged position, it is located in a travel path of at least one of the axially moveable portions.

20 Claims, 11 Drawing Sheets

SYSTEM, METHOD AND APPARATUS FOR A STOWABLE STEERING COLUMN HAVING A COLLAPSE-LIMITED POSITION

CROSS-REFERENCE TO RELATED APPLICATION

This U.S. patent application claims the benefit of and priority to U.S. Provisional Patent Application Ser. No. 62/939,912 filed on Nov. 25, 2019, and titled "System, Method and Apparatus For a Stowable Steering Column Having a Collapse-Limited Position," the entire disclosure of which is hereby incorporated by reference.

TECHNICAL FIELD

This disclosure relates to a steering assembly and, in particular, to a collapse-limiting assembly for a steering column.

BACKGROUND OF THE INVENTION

A vehicle, such as a car, truck, sport utility vehicle, crossover, mini-van, marine craft, aircraft, all-terrain vehicle, recreational vehicle, or other suitable vehicles, include various steering system schemes, for example, steer-by-wire and driver interface steering. These steering system schemes typically include a steering column for translating steering input to an output that interacts with a steering linkage to ultimately cause the vehicle wheels (or other elements) to turn the vehicle. Some steering columns can be movably retracted from an operational position that is close to a driver to a stow position when manual steering control is not needed. For example, stowable steering columns that can retract deep into vehicle instrument panels can provide more work space for a parked driver or for a person sitting in the driver's seat during autonomous driving.

The distance between the operational and stow positions of the steering column can be about 150 mm. This distance is significantly greater than the telescopic range of adjustment (e.g., about 30 mm) that is available with conventional steering columns for driver comfort. One of the challenges with retracting stowable steering columns deep into the instrument panels is correctly managing the retraction of the steering column as it absorbs energy from an impact event.

Although existing solutions have provided a certain amount of workability, improvements in steering column design continue to be of interest. Accordingly, there is a continuing need to improve the operational framework of retraction management features.

SUMMARY

This disclosure relates generally to a collapse-limiting assembly for a collapsible steering column that uses a pyrotechnic element to provide collapse limits to the collapsible steering column.

An aspect of the disclosed embodiments includes a collapse-limiting assembly for a steering column having at least two axially adjustable portions. The collapse-limiting assembly comprises a housing for being located near one of the provided axially adjustable portions and a moveable member located within the housing and moveable between a seated position and a discharged position. The seated position at least partially defined by the moveable member being spaced from interference of movement between the provided axially adjustable portions. The discharged position at least partially defined by the moveable member being located in a travel path of at least one of the provided axially adjustable portions to limit axial travel thereof. A pyrotechnic charge is located within the housing for firing the moveable member from the seated position to the discharged position during an impact event.

Another aspect of the disclosed embodiments includes a steering column assembly comprising a first portion and a second portion that move axially relative to each other between an extended position and a retracted position. A collapse-limiting assembly includes a housing and a moveable member located within the housing. The moveable member is moveable between a seated position discharge position. The seated position at least partially defined by the moveable member being spaced from interference of movement between the first portion and the second portion. The discharged position at least partially defined by the moveable member being located in a travel path of at least one of the first portion and the second portion to limit axial travel thereof. A pyrotechnic charge located within the housing for firing the moveable member from the seated position to the discharged position during an impact event.

Another aspect of the disclosed embodiments includes a steering system comprising a steering column including a first portion and a second portion that move axially relative to each other between an extended position and a retracted position. A collapse-limiting assembly includes a moveable member that is moveable between a seated position and a discharge position. The seated position at least partially defined by the moveable member being spaced from interference of movement between the first portion and the second portion. The discharged position at least partially defined by the moveable member being located in a travel path of at least one of the first portion and the second portion to limit axial travel thereof. A pyrotechnic charge for firing the moveable member from the seated position to the discharged position during an impact event. A processor and a memory that includes instructions that, when executed by the processor, cause the processor to sense an impact event and, in response to sensing an impact event, fire the pyrotechnic charge.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to indicate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable vehicles, include various steering system schemes, for example, steer-by-wire and driver interface steering. These steering system schemes typically include a steering column for translating steering input to an output that interacts with a steering linkage to ultimately cause the vehicle wheels (or other elements) to turn the vehicle. Some steering columns can be movably retracted from an operational position that is close to a driver to a stow position when manual steering control is not needed. For example, stowable steering columns that can retract deep into vehicle instrument panels can provide more work space for a parked driver or for a person sitting in the driver's seat during autonomous driving.

The distance between the operational and stow positions of the steering column can be about 150 mm. This distance is significantly greater than the telescopic range of adjustment (e.g., about 30 mm) that is available with conventional steering columns for driver comfort. One of the challenges with retracting stowable steering columns deep into the instrument panels is correctly managing the retraction of the steering column as it absorbs energy from an impact event.

Although existing solutions have provided a certain amount of workability, improvements in steering column design continue to be of interest. Accordingly, systems and methods, such as those described herein, configured to provide improved the operational framework of retraction management features, may be desirable. In some embodiments, the systems and methods described herein may be configured to provide improvements to the operational framework of retraction management features.

In some embodiments, the systems and methods described herein may be configured to provide a collapse-limiting assembly for a collapsible steering column. For example, the collapse-limiting assembly uses a pyrotechnic element to provide retraction limits to the collapsible steering column.

In some embodiments, the systems and methods described herein may be configured to provide a collapse limit to a collapsible steering column.

Figure 1:
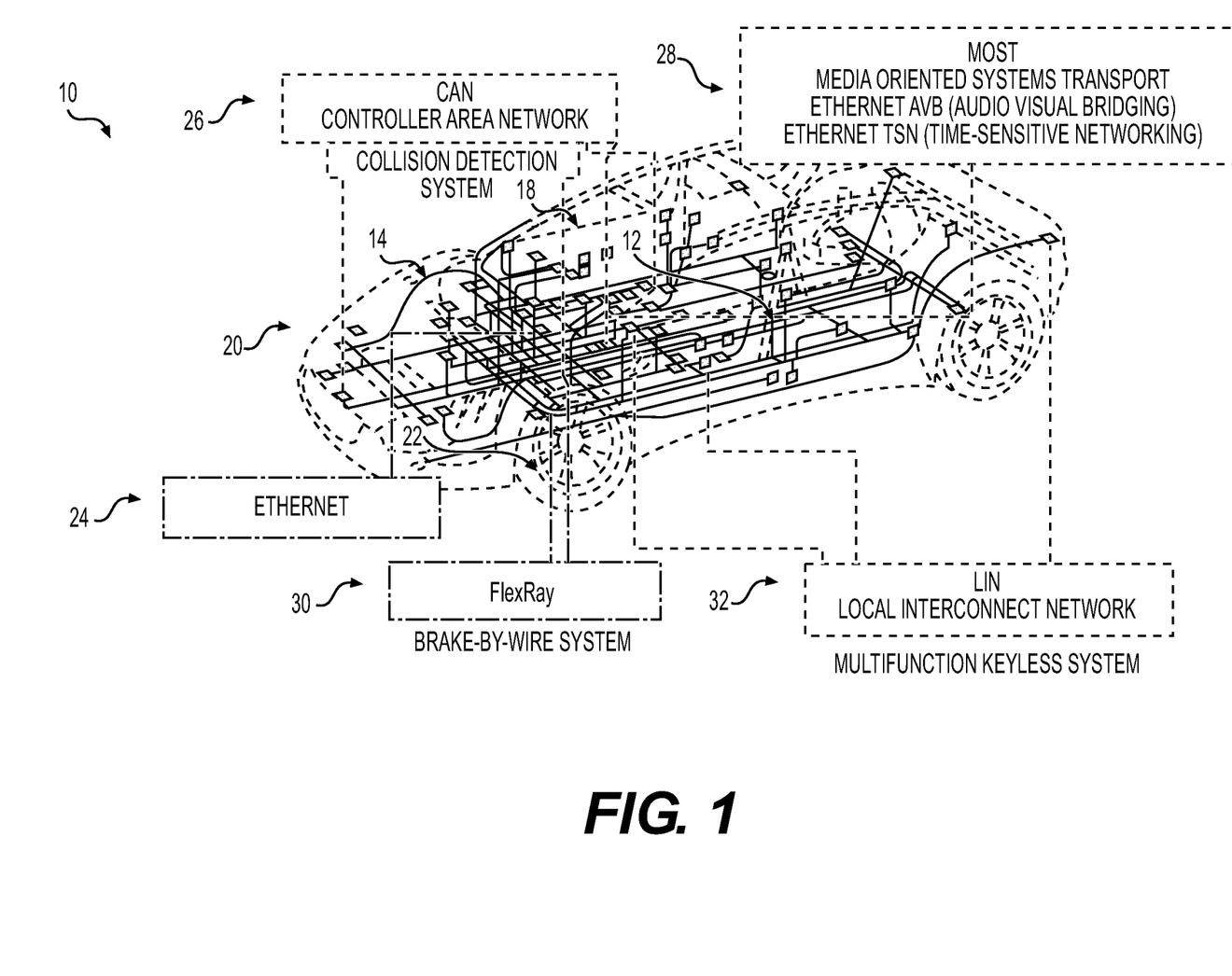
FIG. 1 generally illustrates a vehicle according to the principles of the present disclosure.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles.

The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay Component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

Figure 2:
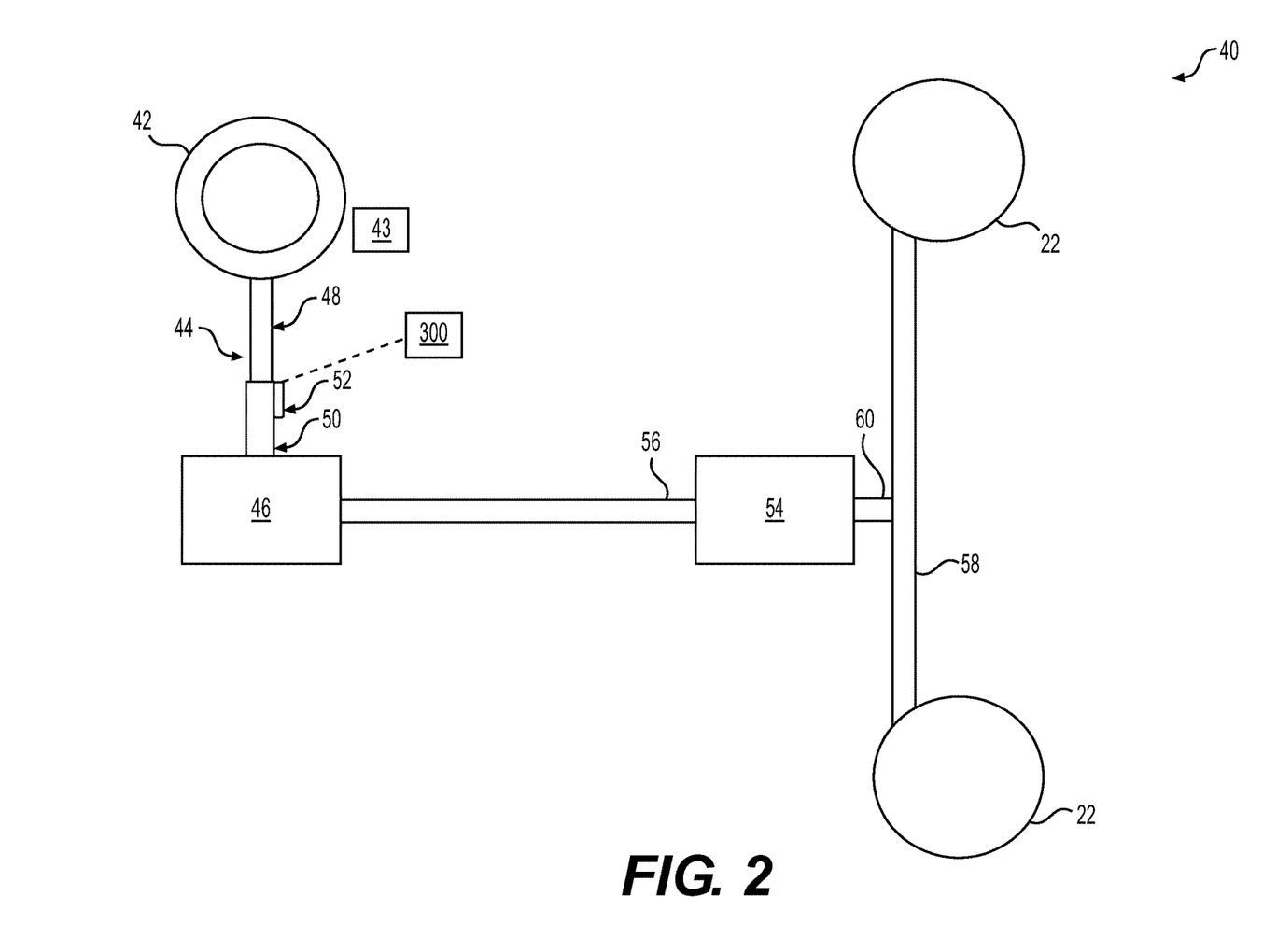
FIG. 2 generally illustrates a steering system of the vehicle according to the principles of the present disclosure.
Figure 10:
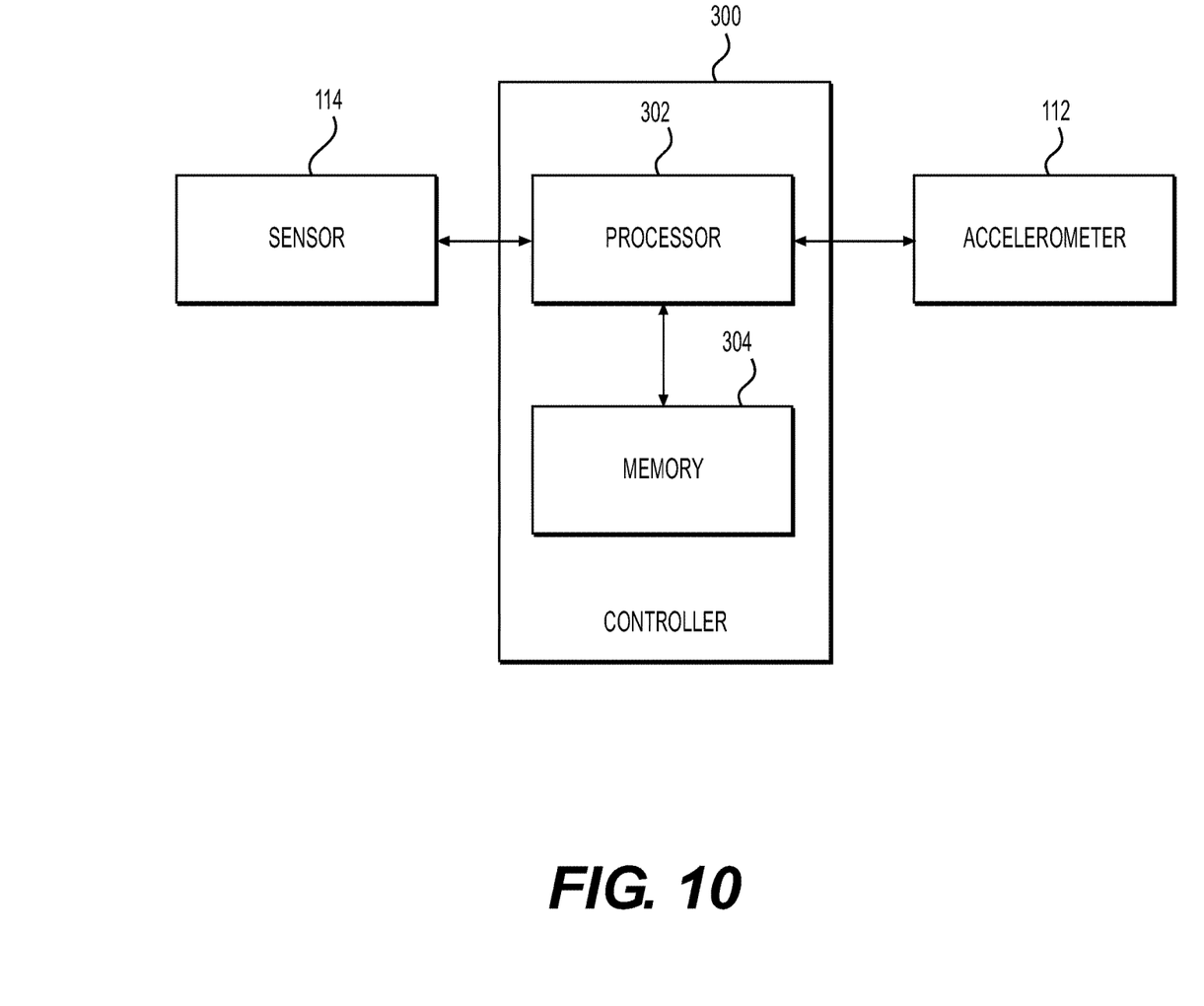
FIG. 10 generally illustrates a block diagram of a controlling system of the collapse-limiting assembly.

In some embodiments, the vehicle 10 may further include a steering system 40 as is generally illustrated in FIG. 2. The steering system 40 may be configured as a driver interface steering system, an autonomous driving system, or a system that allows for both driver interface and autonomous steering. The steering system may include an input device 42, such as a steering wheel, wherein a driver may mechanically provide a steering input by turning the steering wheel. An airbag device 43 may be located on or near the input device 42. A steering column 44 extends along an axis from the input device 42 to a output assembly 46. The output assembly 46 may include a pinion shaft assembly, an I-shaft, a cardan joint, steer-by-wire components or any other features conventionally located opposite the input device 42. The steering column 44 may include a first portion 48 and a second portion 50 that are permitted to move axially with respect to one another during an impact or other compressive forces. The first portion 48 and second portion 50 may be configured as jackets, brackets, rails, or other members that permit axial movement therebetween. The axial movement may include sliding, telescopic, translating, and other axial movements. The steering column 44 may include additional features that permit axial movement and brackets that provide rake and tilt movement. A collapse-limiting assembly 52 may be located on one or each of the first portion 48, the second portion 50, and any brackets, and provide a steering column collapse limit functionality. As will be described in greater detail below, behavior of the collapse-limiting assembly 52 may be controlled via a control system 300 (FIG. 10).

Figure 7:
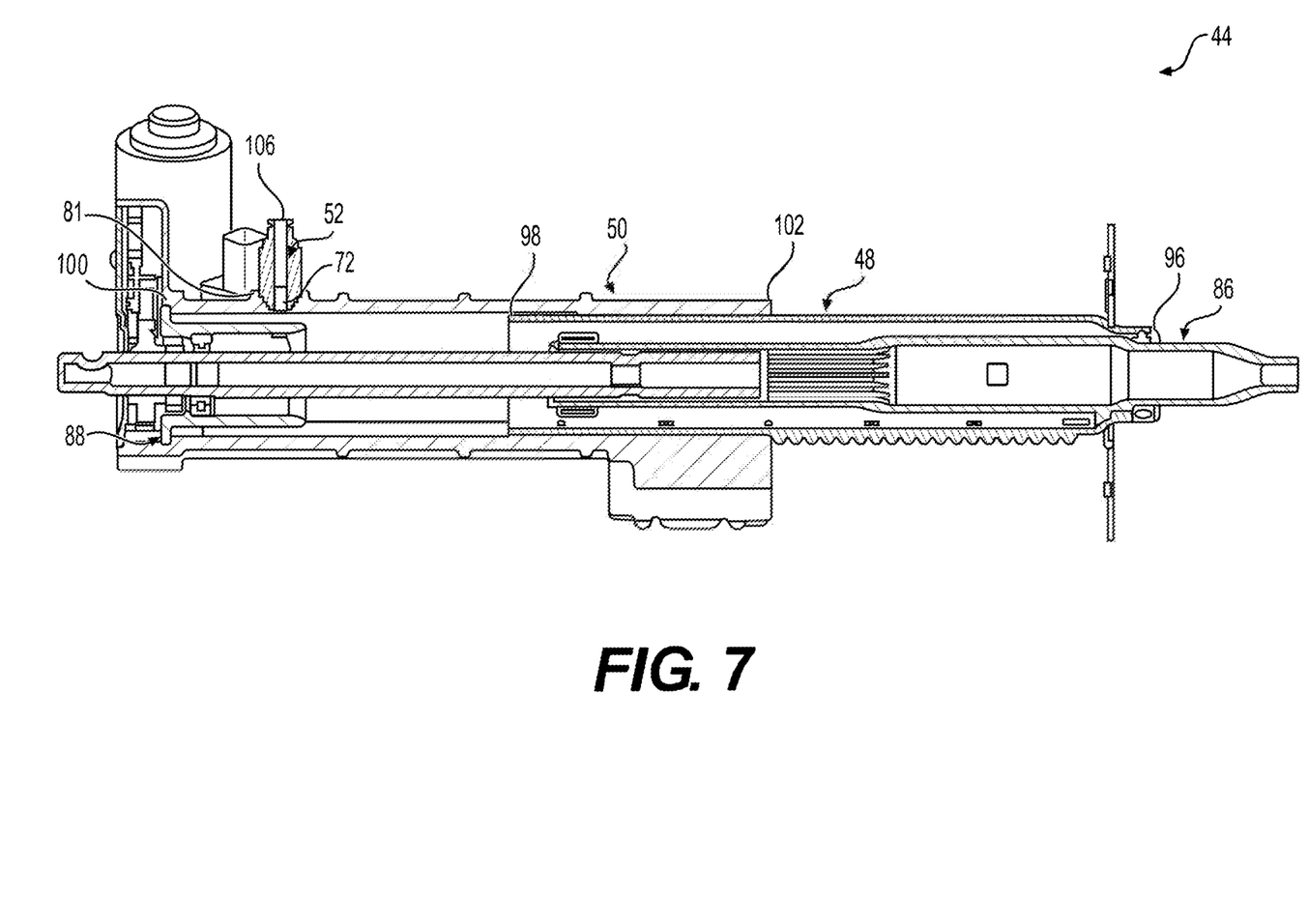
FIG. 7 generally illustrates a sectional side view of an embodiment of the steering column of FIG. 3 in an extended position.
Figure 8:
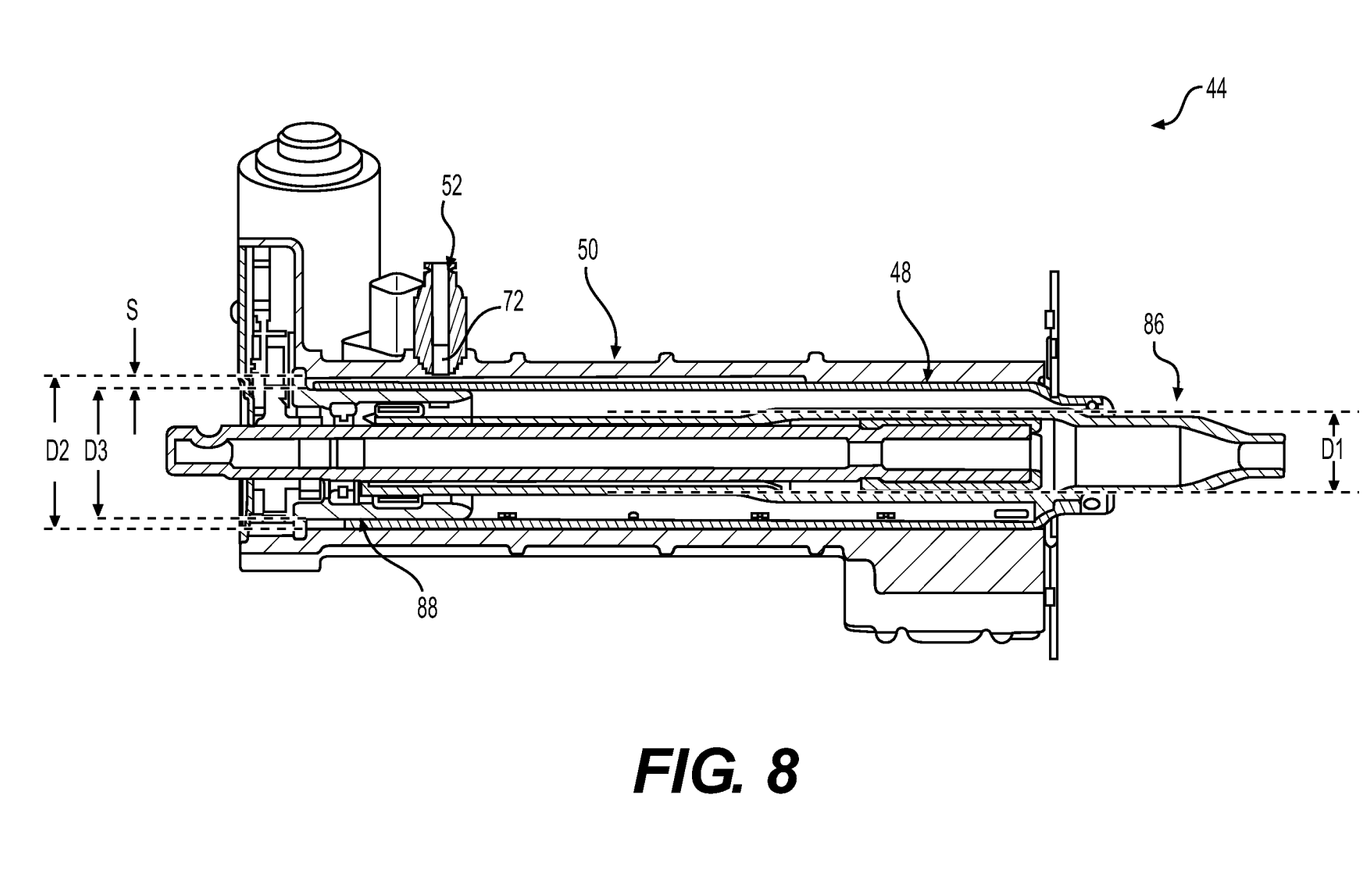
FIG. 8 generally illustrates a sectional side view of an embodiment of the steering column of FIG. 3 in a retracted position.

The steering column 44 is moveable between a range of positions from an extended position (FIG. 7) to a retracted position (FIG. 8). In the extended position, the first portion 48 and second portion 50 are moved axially away from each other so that the input device 42 is located near an operator of the vehicle. In the retracted position, the first portion 48 and second portion 50 are moved axially towards each other so that the input device 42 is located away from an operator of the vehicle. In some embodiments, the retracted position may correspond to stowing the input device 42. For example, it may be beneficial to place the input device 42 in a stowed location during autonomous driving. In some embodiments, the retracted position can be on the order of about 150 mm away from the extended position, such as at least 100 mm, or at least about 125 mm away from the extended position.

In operation, the collapse-limiting assembly 52 locks travel between the first portion 48 and the second portion 50 at a collapse-limited position (FIG. 9) located somewhere between the extended position and the retracted position. The travel lock at the collapse-limited position prevents the input device 42 from being fully retracted during an impact event. In some embodiments, the collapse-limited position can be within 100 mm away from the extended position, such as at least 50 mm, or at least 75 mm away from the extended position. In some embodiments, the collapse-limited position can be at least 25 mm away from the retracted position, such as at least 50 mm away from the retracted position.

A steering gear assembly 54 may connect to the output assembly 46 via a steering gear input shaft 56. The steering gear assembly 54 may be configured as a rack-and-pinion, a recirculating ball-type steering gear, or any other types of steering gears associated with autonomous and driver-interface steering systems. The steering gear assembly 54 may then connect to a driving axle 58 via an output shaft 60. The output shaft 60 may include a pitman arm and sector gear or other traditional components. The output shaft 60 is operably connected to the steering gear assembly 54 such that a rotation of the steering gear input shaft 56 causes a responsive movement of the output shaft 60 and causes the drive axle to turn the wheels 22.

Figure 3:
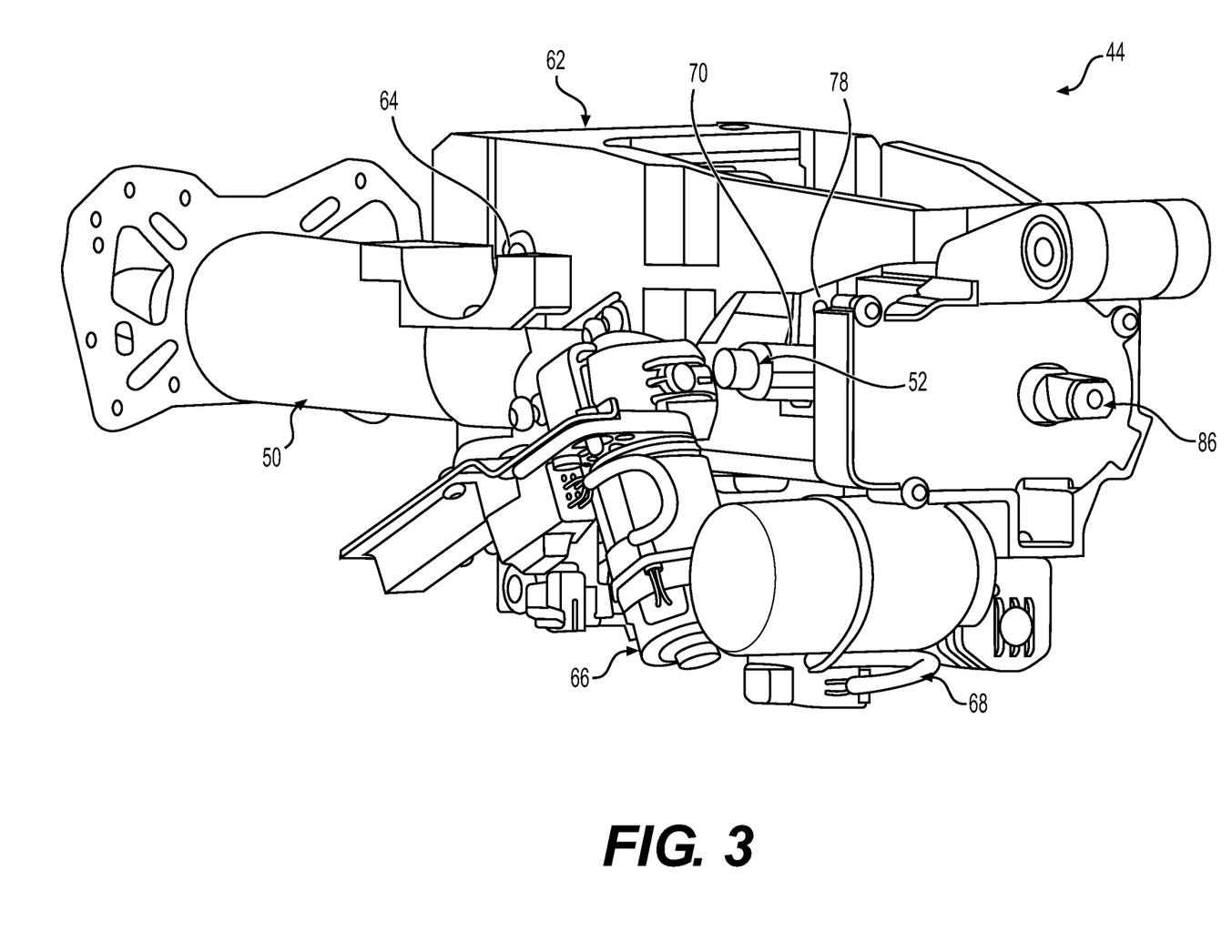
FIG. 3 generally illustrates a rear isometric view of an embodiment of a steering column.

As best illustrated in FIG. 3, the steering column 44 may be connected to the vehicle via a bracket 62. The bracket 62 may include a pivot connection 64 for allowing rake movement of the steering column 44. The steering system 40 may further include a rake actuator 66 for setting a rake position and an axial actuator 68 for moving the first portion 48 axially relative to the second portion 50. Each actuator 66, 68 may include a motor-driven gear arrangement, such as a motor-driven lead screw. Operation of each actuator 66, 68 may be controlled via a control system 300 (FIG. 10).

As best illustrated in FIGS. 3 through 9, the collapse-limiting assembly 52 may be located on the second portion 50, and the second portion 50 may be a tubular member that receives the first portion 48, which is also a tubular member, to permit relative telescopic movement thereof. However, it should be appreciated that the collapse-limiting assembly 52 may be located on the first portion 48 or somewhere else on or near the steering column 44.

Figure 6:
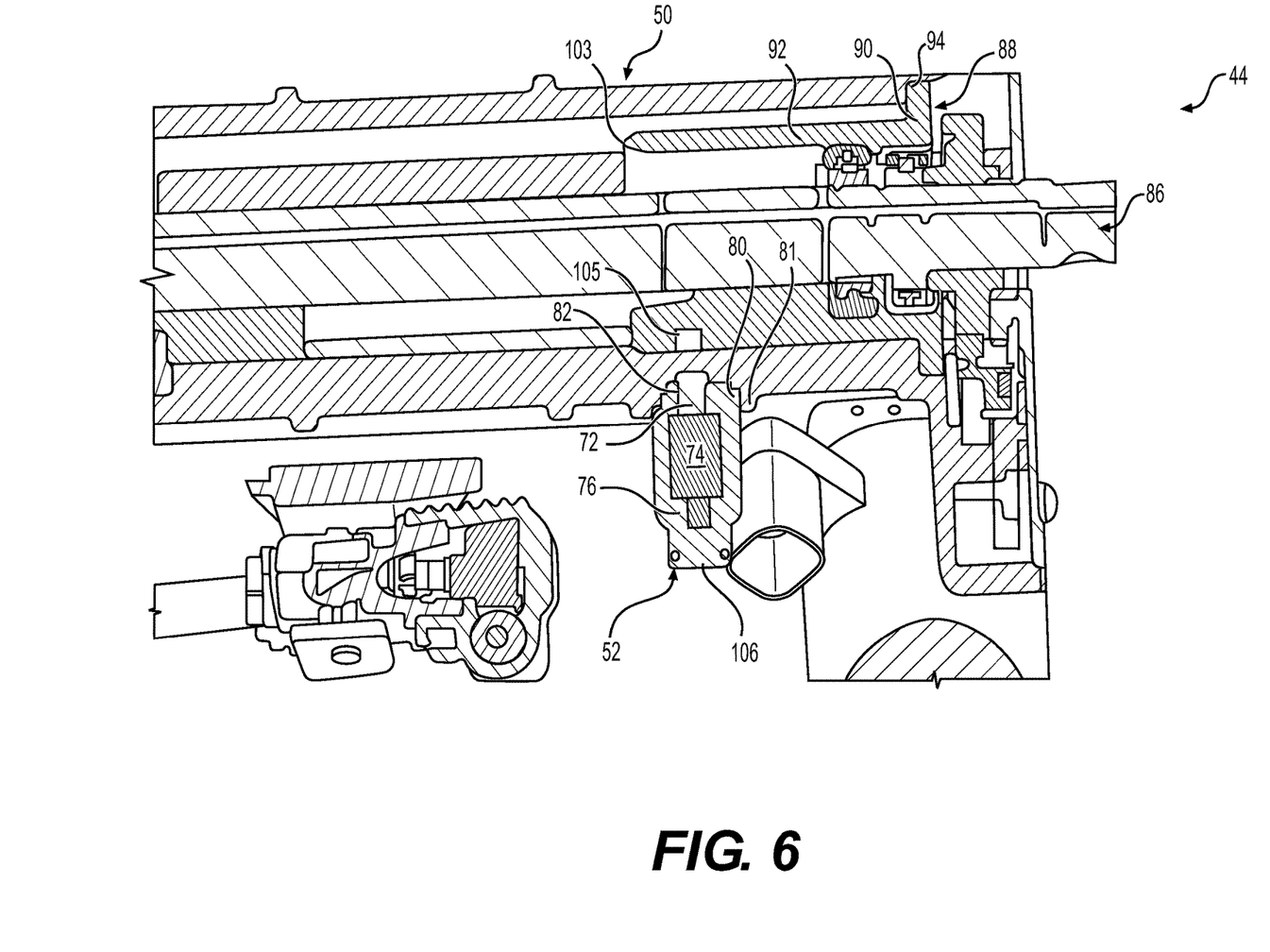
FIG. 6 generally illustrates a sectional side view of a portion of an embodiment of the steering column of FIG. 3.
Figure 9:
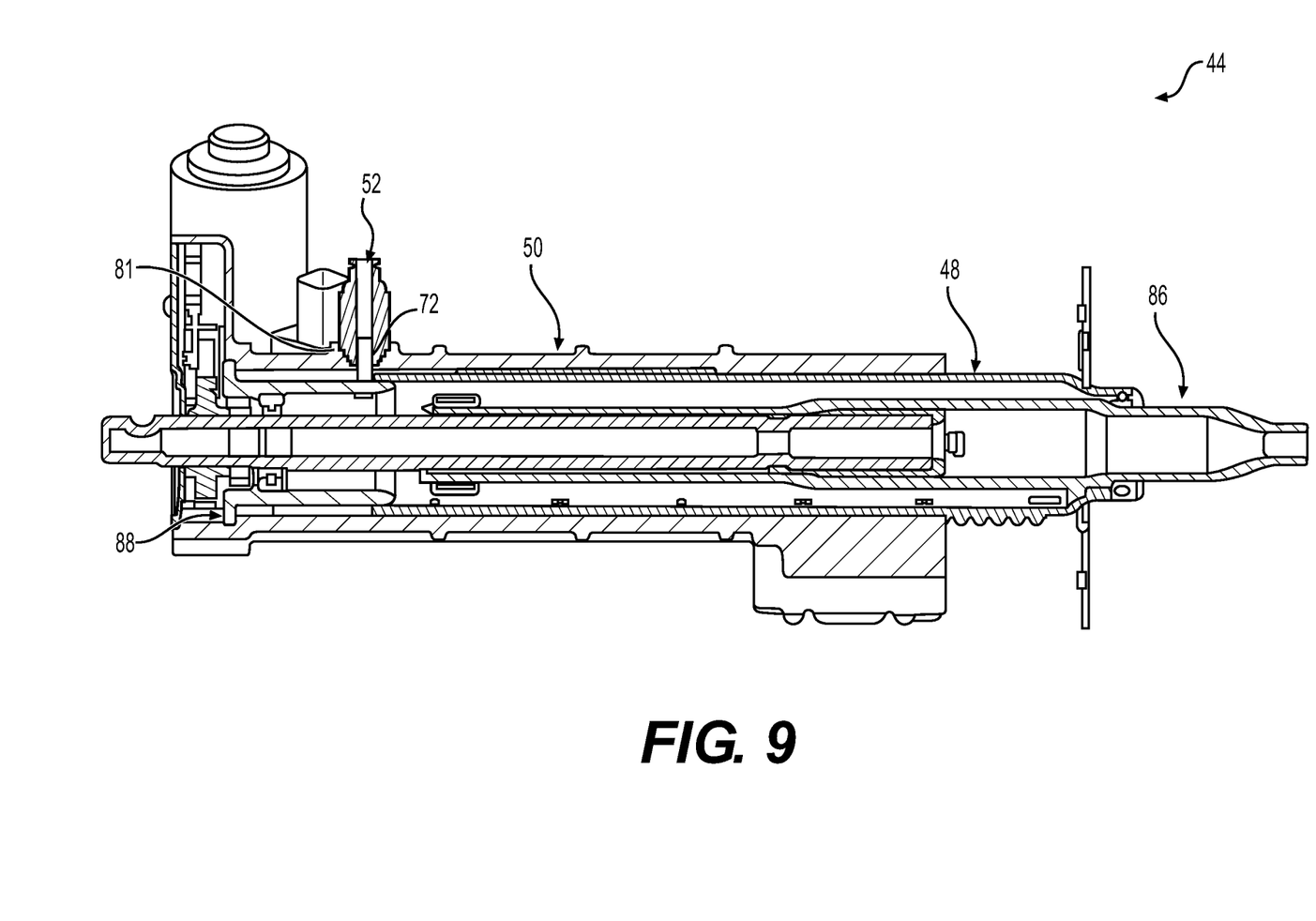
FIG. 9 generally illustrates a sectional side view of an embodiment of the steering column of FIG. 3 in a collapse-limited position.

The collapse-limiting assembly 52 includes a housing 70 mounted to the second portion 50 and a moveable member 72 located within the housing 70. In operation, the moveable member 72 includes a seated position (FIG. 8) and a discharged portion (FIG. 9). In the seated position, the moveable member 72 is positioned in the housing 70 away from interference of relative movement between the first portion 48 and the second portion 50, permitting the steering column 44 to be placed in the retracted position. In the discharged position, the moveable member 72 is positioned at least partially outside of the housing 70 and into a travel path of at least one of the first portion 48 and the second portion 50 to prevent axial movement beyond the collapse-limited position. In some embodiments, the moveable member 72 may be configured as a pin. Movement of the moveable member 72 may be by operation of a collapse actuator 74 (FIG. 6). In some embodiments, the collapse actuator 74 may include a pyrotechnic charge or other electrically-driven configurations. In some embodiments, the collapse actuator 74 includes a detonator 76 in communication with the control system 300 and the pyrotechnic charge. In some embodiments, the pyrotechnic charge may consist of primary pyrotechnic reactants or secondary pyrotechnic reactants. For example, the primary pyrotechnic reactants may include nitroglycerin and the secondary pyrotechnic reactants may include trinitrotoluene, black powder, or other reactants.

Figure 4:
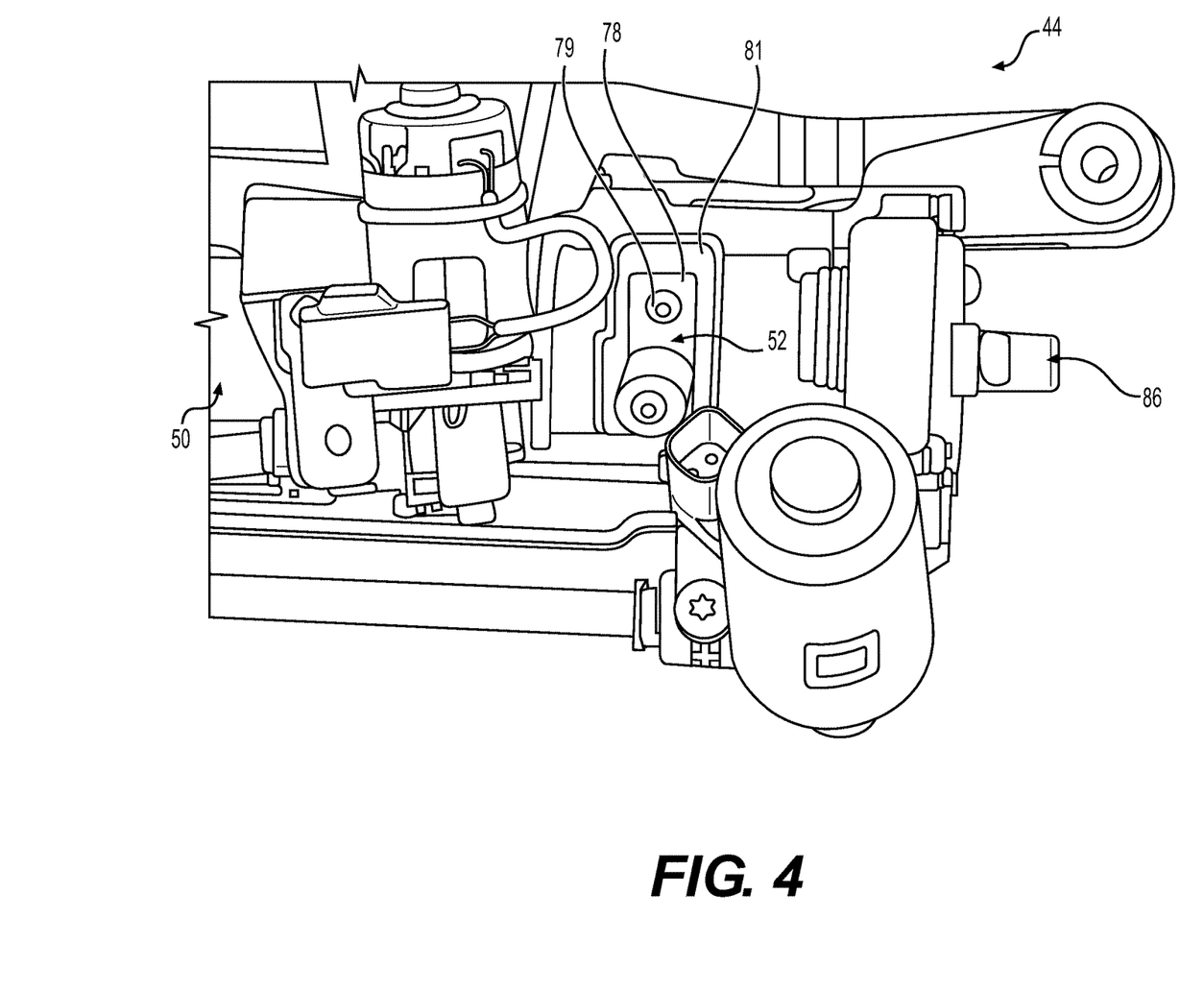
FIG. 4 generally illustrates a side view of a portion of an embodiment of the steering column of FIG. 3.
Figure 5:
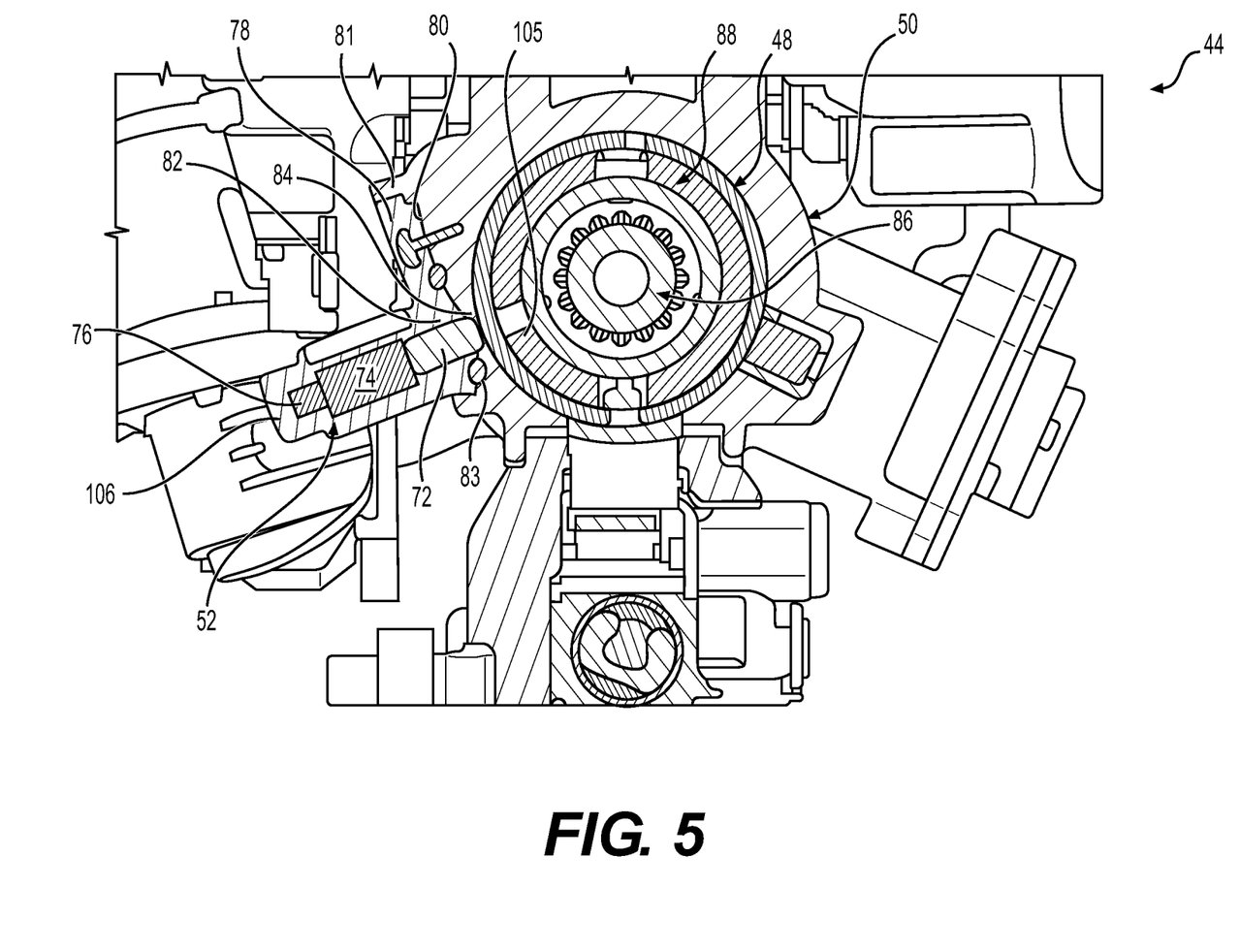
FIG. 5 generally illustrates a rear view of a portion of an embodiment of the steering column of FIG. 3.

As best illustrated in FIGS. 4 through 6, the housing 70 may include a base portion 78 and the second portion 50 may include a recess 80 defined by retaining walls 81 for locating the base portion 78. The retaining walls 81 may be integral with the second portion 50. At least one fastener 79 may extend through the base portion 78 and into the recess 80 for holding the housing 70 against the second portion 50. The housing 70 includes a channel 82 that the moveable member 72 extends through when it is in the discharged position. The second portion 50 includes a cooperating channel 84 (FIG. 5), aligned with the channel 82, for receiving the moveable member 72 in the discharged position. A sealing member 83 (FIG. 5) may be located around the interface of the channels 82, 84 to retain the reaction of the pyrotechnic charge and focus it on the moveable member 72. A steering shaft 86 may extend coaxially with the first portion 48 and the second portion 50. For example, the steering shaft 86 may extend through the first portion 48 and the second portion 50.

As best illustrated in FIGS. 6 through 9, a collar 88 may be located about the steering shaft 86 and the inside the second portion 50. The collar 88 may be annularly-shaped and include a flange portion 90 and a receiving wall 92. An internal surface of the second portion 50 may further include a stepped recess 94 for locating the flange portion 90. The first portion 48 extends between an upper end 96 to an inner interface end 98 and the second portion 50 extends between a lower end 100 and an outer interface end 102. In operation, the inner interface end 98 is received within the outer interface end 102 and travels towards the lower end 100 as the steering column 44 is adjusted towards the retracted position. As best illustrated in FIG. 8, the first portion 48 may include a first diameter D1 and the second portion 50 may include a second diameter D2 that is more than the first diameter D1. The In some embodiments, the collar 88 is at or near the lower end 100 and the receiving wall includes a third diameter D3 that is less than the first diameter D1 to define an annular spacing S therebetween. In operation, the first member 48 is permitted to move axially within the annular spacing S between the second diameter D2 and the third diameter D3 until it contacts the flange portion 90 when the steering column 44 is in the retracted position. In some embodiments, the receiving wall 92 may extend from the flange portion 90 to a cam portion 103 (FIG. 6) that includes an angled surface for aligning the first portion 48 into the annular spacing S during compression (i.e., collapse).

With continued reference to FIGS. 6 through 9, the receiving wall 92 may include an opening 105 aligned with channels 82, 84 for receiving at least a portion of the moveable member 72 when it is in the discharged position (FIG. 8). The channels 82, 84 and the opening 105 may be radially aligned such that the moveable member 72 moves towards the axis of the steering shaft 86 in the discharged position. At least one connection 106 to a source of electricity is provided to the collapse actuator 74. The electricity received by the collapse actuator 74 from the connection 106 may be controlled via the control system 300.

FIG. 10 generally illustrates the control system 300 according to the principles of the present disclosure. The system 300 may include a controller 302 and the controller 302 may include a processor 304 and a memory 306. The processor 304 may include any suitable processor, such as those described herein. Additionally, or alternatively, the controller 302 may include any suitable number of processors, in addition to or other than the processor 304. The memory 306 may comprise a single disk or a plurality of disks (e.g., hard drives), and includes a storage management module that manages one or more partitions within the memory 306. In some embodiments, memory 306 may include flash memory, semiconductor (solid state) memory or the like. The memory 306 may include Random Access Memory (RAM), a Read-Only Memory (ROM), or a combination thereof. The memory 306 may include instructions that, when executed by the processor 304, cause the processor 304 to, at least, perform the systems and methods described herein. The control system 300 may further include an accelerometer 112 to provide a fail-safe introduction of electricity to the collapse actuator 74 in the event of controller 302 malfunction. The control system 300 may further include at least one sensor 114 for determining a magnitude of compression of the steering column 44, the velocity of compression, the acceleration of compression, a seatbelt status, and/or an airbag status. The controller 302 may control operations of the collapse actuator 74, the airbag 43, and other features.

Accordingly, systems and methods, such as those described herein, configured to provide a steering column 44 compression limit, may be desirable. In some embodiments, the controller 302 described herein may be configured to provide a pre-selected amplitude of electricity through the connection 106 to the collapse actuator 74 during an impact event. The input of electricity may be based on at least one of seat belt status, airbag status, accelerometer readings, and steering column compression velocity.

In some embodiments, the controller 302 described herein may be configured to provide an order to the collapse actuator 74 during an impact event. For example, the controller 302 may provide an order to the collapse actuator 74 upon an indication of an impact event to move the moveable member 72 from the seated position to a discharged position. In some embodiments, the order is sent to a detonator 76 to detonate a pyrotechnic charge and fire a pin into the travel path of the first portion or the second portion.

In some embodiments, the controller 302 described herein may be configured to provide an order to the collapse actuator 74 during an impact event. For example, the controller 302 may provide an order to the collapse actuator 74 upon an indication of an impact event to move the moveable member 72 from the seated position to a discharged position. In some embodiments, the order is sent to the collapse actuator 74 upon an indication that the airbag 43 has been deployed.

In some embodiments, the controller 302 described herein may be configured to provide an order to the collapse actuator 74 during an impact event. For example, the controller 302 may provide an order to the collapse actuator 74 upon an indication of an impact event to move the moveable member 72 from the seated position to a discharged position. In some embodiments, the order is sent to the collapse actuator 74 upon an indication from an accelerometer 112 that an impact event is occurring.

In some embodiments, the controller 302 described herein may be configured to provide an order to the collapse actuator 74 during an impact event. For example, the controller 302 may provide an order to the collapse actuator 74 upon an indication of an impact event to move the moveable member 72 from the seated position to a discharged position.

In some embodiments, the order is sent to the collapse actuator 74 upon an indication that the steering column is being compressed at a predetermined velocity.

In some embodiments, the controller 302 described herein may be configured to provide an order to the collapse actuator 74 during an impact event. For example, the controller 302 may provide an order to the collapse actuator 74 upon an indication of an impact event to move the moveable member 72 from the seated position to a discharged position. In some embodiments, the order is sent to the collapse actuator 74 upon an indication that the steering column is being compressed at a predetermined acceleration.

In some embodiments, the controller 302 described herein may be configured to provide an order to the collapse actuator 74 during an impact event. For example, the controller 302 may provide an order to the collapse actuator 74 upon an indication of an impact event to move the moveable member 72 from the seated position to a discharged position. In some embodiments, the order is sent to the collapse actuator 74 upon an indication that the steering column has compressed a predetermined distance without actuation from the axial actuator 68.

In some embodiments, the controller 302 described herein may be configured to provide an order to the collapse actuator 74 during an impact event. For example, the controller 302 may provide an order to the collapse actuator 74 upon an indication of an impact event to move the moveable member 72 from the seated position to a discharged position. In some embodiments, the order is sent to the collapse actuator 74 upon an indication of an impact event and an indication that a seatbelt is not being used by a vehicle operator.

Figure 11:
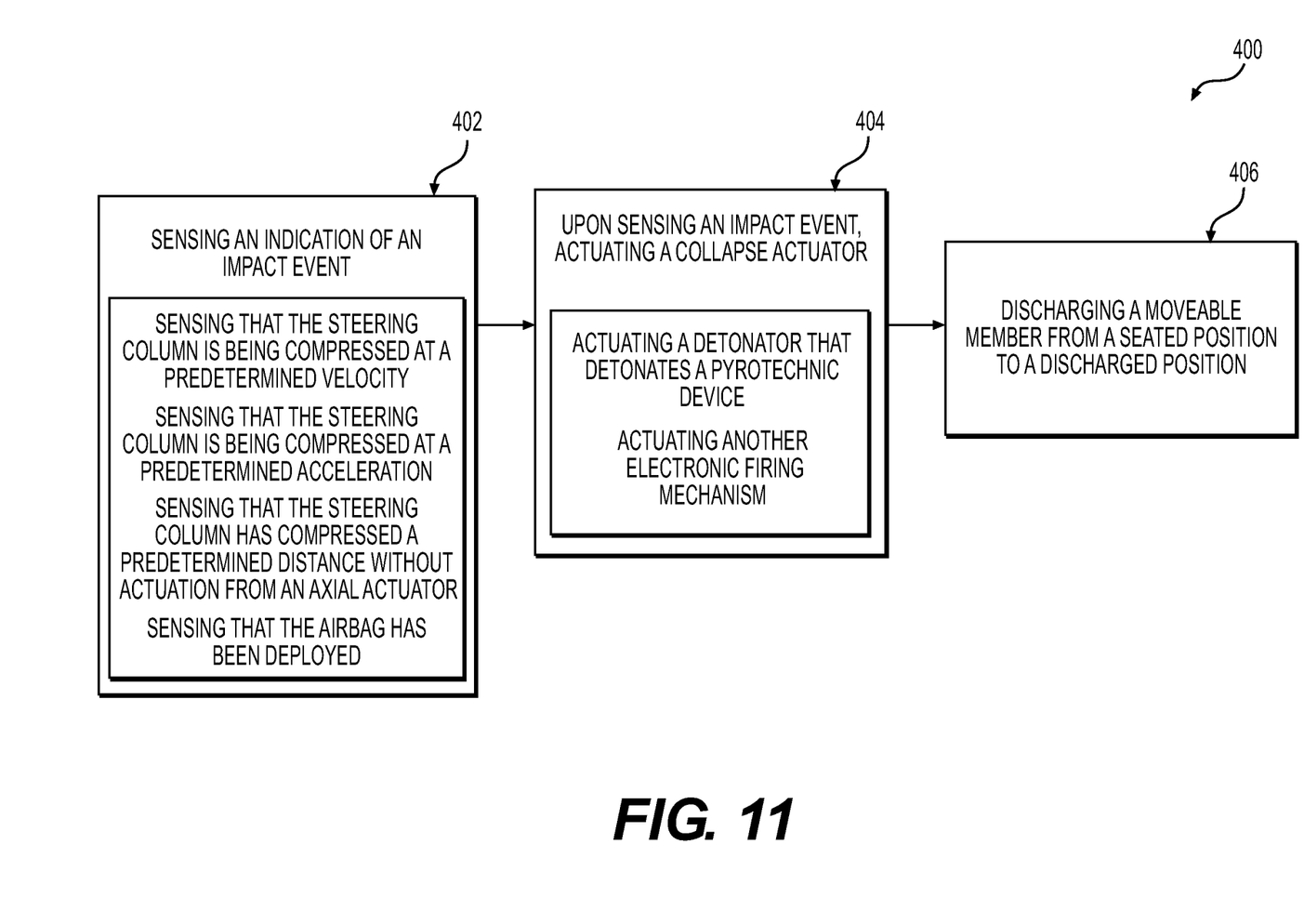
FIG. 11 generally illustrates a collapse limiting method according to principles of the present disclosure.

In accordance with these and other features, a method 400 of providing a collapse limit to a steering column is provided. At 402, the method includes sensing an indication of an impact event. For example, sensing that the steering column is being compressed at a predetermined velocity, sensing that the steering column is being compressed at a predetermined acceleration, sensing that the steering column has compressed a predetermined distance without actuation from an axial actuator, or sensing that the airbag has been deployed. In some embodiments, at 402, the method 400 may require sensing two or more of the above indications of an impact event. In some embodiments, the method 400 may require sensing one of the above factors in conjunction with an indication that a seatbelt is not being used.

At 404, the method 400 may include, upon sensing an impact event, actuating a collapse actuator. For example, the collapse actuator may be actuated via actuation of a detonator that detonates a pyrotechnic device. In other examples, the collapse actuator may be actuated via actuation of other electronic firing mechanisms.

At 406, as a result of actuating the collapse actuator, a moveable member is discharged from a seated position to a discharged position, wherein it interferes with the axial movement of one or both of a first portion and a second portion that move axially relative to one another during compression of the steering column. For example, the moveable member may include a pin that travels towards an axis of the steering column through an outer second portion and into the path of an inner first portion. In some embodiments, the pin may travel into an opening on a collar.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. A collapse-limiting assembly for a steering column, the steering column having at least two axially adjustable portions, the collapse-limiting assembly comprising:
   a housing for being located near one of the provided axially adjustable portions;
   a moveable member located within the housing and moveable between a seated position and a discharged position, the seated position at least partially defined by the moveable member being spaced from interference of movement between the provided axially adjustable portions, the discharged position at least partially defined by the moveable member being located in a travel path of at least one of the provided axially adjustable portions to limit axial travel thereof; and
   a pyrotechnic charge located within the housing for firing the moveable member from the seated position to the discharged position during an impact event.

2. The collapse-limiting assembly of claim 1, wherein the moveable member includes a pin that travels towards a longitudinal axis of the provided steering column when the pin travels towards the discharged position.

3. The collapse-limiting assembly of claim 2, wherein the housing includes a base portion for mounting to at least one of the provided axially adjustable portions.

4. The collapse-limiting assembly of claim 3, wherein the base portion includes a sealing member located between the base portion and at least one of the provided axially adjustable portions for retaining the reaction of the pyrotechnic charge and focusing the reaction on the pin.

5. The collapse-limiting assembly of claim 1, further comprising a detonator located within the housing for selectively causing a reaction to the pyrotechnic charge.

6. The collapse-limiting assembly of claim 5, wherein the detonator includes a connection for a source of electricity in communication with a provided controller for selectively causing a reaction to pyrotechnic charge upon at least one of an airbag deployment, a collapsing of the steering column at a predetermined velocity, a collapsing of the steering column at a predetermined acceleration, or a predetermined acceleration reading.

7. The collapse-limiting assembly of claim 1, wherein the pyrotechnic charge includes at least one of trinitrotoluene or black powder.

8. A steering column assembly comprising:
a first portion and a second portion that move axially relative to each other between an extended position and a retracted position;
a collapse-limiting assembly having a housing and a moveable member located within the housing and moveable between a seated position and a discharged position, the seated position at least partially defined by the moveable member being spaced from interference of movement between the first portion and the second portion, the discharged position at least partially defined by the moveable member being located in a travel path of at least one of the first portion and the second portion to limit axial travel thereof;
wherein when the moveable member is located in the discharged position, the first portion and the second portion are prevented from moving into the retracted position at a collapse-limited position by the moveable member; and
a pyrotechnic charge located within the housing for firing the moveable member from the seated position to the discharged position during an impact event.

9. The steering column assembly of claim 8, further including a location for placement of a driver input device on one of the first portion and the second portion and wherein the location for placement of the driver input device is in a stowed position associated with autonomous driving when the first portion and the second portion are in the retracted position.

10. The steering column assembly of claim 8, wherein the first portion is received within the second portion and wherein the housing is located on the second portion.

11. The steering column assembly of claim 10, wherein the housing includes a base portion for connection to the second portion.

12. The steering column assembly of claim 11, wherein the second portion includes at least one retaining wall that outlines the base portion.

13. The steering column assembly of claim 12, further comprising at least one sealing member between the base portion and the second portion.

14. The steering column assembly of claim 10, wherein the housing includes a channel, the second portion includes a cooperating channel, and wherein the moveable member extends through and past the channel and the cooperating channel when the moveable member is in the discharged position.

15. The steering column assembly of claim 14, further comprising a collar located in the second portion opposite the housing, wherein the collar is located in a spaced relationship from an interior surface of the second portion, and wherein the first portion is permitted to travel between the collar and the second portion until it contacts a flanged portion of the collar when the first portion and the second portion are in the retracted position.

16. The steering column assembly of claim 15, wherein the collar defines an opening for receiving a portion of the moveable member when the moveable member is in the discharged position and the first portion is limited at the collapse-limited position at a location of the moveable member.

17. The steering column of claim 16, wherein the opening on the collar and the flanged portion of the collar are spaced 100 mm or less apart from one another.

18. A steering system comprising:
a steering column including a first portion and a second portion that move axially relative to each other between an extended position and a retracted position;
a collapse-limiting assembly having a moveable member moveable between a seated position and a discharged position, the seated position at least partially defined by the moveable member being spaced from interference of movement between the first portion and the second portion, the discharged position at least partially defined by the moveable member being located in a travel path of at least one of the first portion and the second portion to limit axial travel thereof;
a pyrotechnic charge for firing the moveable member from the seated position to the discharged position during an impact event;
a processor;
a memory that includes instructions that, when executed by the processor, cause the processor to:
sense an impact event; and
in response to sensing an impact event, fire the pyrotechnic charge.

19. The system of claim 18, wherein the processor is further caused to sense an impact event from at least one of a sensing that the steering column is being compressed at a predetermined velocity, sensing that the steering column is being compressed at a predetermined acceleration, sensing that the steering column has compressed a predetermined distance without actuation from an axial actuator, or sensing that an airbag has been deployed.

20. The system of claim 19, wherein the processor is further caused to actuate a detonator.

* * * * *